Oct. 15, 1940. A. SCHWARZ Re. 21,599

PROCESS OF AND APPARATUS FOR REFRIGERATION

Original Filed April 18, 1930 2 Sheets-Sheet 1

INVENTOR
AUGUST SCHWARZ

BY Chindahl, Parker & Carlson
ATTORNEYS

PROCESS OF AND APPARATUS FOR REFRIGERATION

Original Filed April 18, 1930 2 Sheets-Sheet 2

Witness:
William P. Kilroy

Inventor:
August Schwarz
Hill. Kilp
Attys.

By

Reissued Oct. 15, 1940

Re. 21,599

UNITED STATES PATENT OFFICE 21,599

PROCESS OF AND APPARATUS FOR REFRIGERATION

August Schwarz, Chicago, Ill.

Original No. 1,951,447, dated March 20, 1934, Serial No. 445,390, April 18, 1930. Application for reissue February 25, 1935, Serial No. 8,199

20 Claims. (Cl. 62—115)

The present invention relates generally to an improved process of and apparatus for refrigeration, and has reference more particularly to a novel process of refrigeration embodying the use of carbon dioxide ($CO_2$) as the refrigerant. In certain respects, the present invention is an improvement of that disclosed in my copending application Serial Number 429,176, filed February 17, 1939.

One of the objects of the present invention resides in a novel process of refrigeration in which carbon dioxide as the refrigerant is condensed and cooled by means of cold brine having approximately zero Fahrenheit so that very low condenser pressure, resulting in an exceptionally low temperature of vaporization by low suction pressure, will be obtained.

Other objects reside in the provision of a new and improved process of refrigeration which comprises two stages for liquefying and vaporizing the refrigerant to produce low temperatures by low condensing and suction pressures, and in the preferred form of which the low temperature refrigerant is carbon dioxide, and the refrigerating medium for condensing the carbon dioxide is vaporized ammonia.

Further objects are to provide a novel refrigerating plant which may be utilized to accomplish the foregoing objects, and which comprises an arrangement of pipes and valves, for connecting the various operating units, adjustable at will to produce selectively any one of a plurality of systems, for example, (1) a two stage system adapted to operate at different pressures, and (2) a single stage system in which the evaporator is adapted to be connected in a closed circuit with either a water cooled condenser or a brine cooled condenser, and (3) a split stage system wherein the water cooled condenser may be connected with the brine or gas cooled condenser and wherein the brine or gas cooled condenser unit functions as an evaporator.

Another object of my invention is to provide a refrigeration system employing carbon dioxide, or a similar refrigerant, having a brine cooled or a gas cooled condenser wherein the system operates with a lesser amount of refrigerant, which would not condense under atmospheric condition and wherein the refrigerant gas in the condenser is cooled by cold brine or gas and the carbon dioxide gas is only partly liquefied or densified, under low pressure, and whereby said partly liquefied or densified gas is expanded down to approximately atmospheric pressure or by creating a vacuum on the low side of the system.

Another object of the invention is in providing a low temperature condensing and cooling apparatus wherein the heat absorbing surface of the refrigerant evaporating passage is approximately twenty-five per cent greater than the heat transfer surface of the condenser passage.

Other objects and advantages will become apparent as the description proceeds.

In the accompanying drawings—

In the plant according to the present invention a condenser 12 is provided through which a refrigerant is forced by pressure exerted by a compressor 14.

Figure 5:
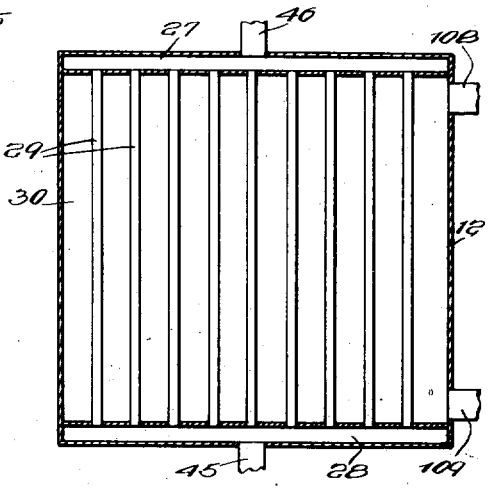
Figure 5 is a horizontal sectional view through a condenser shown in plan in Figure 1.

The refrigerant flows from said compressor through a pipe line 45 in which valves 57 and 58 are located and into a header 28 of condenser 12. The condenser 12 (see Figure 5) has a pair of header tanks 27 and 28 and a plurality of condenser tubes 29 connecting said two header tanks. These tubes extend through the space 30 in the condenser 12. The liquefied refrigerant flows from the header tank 27 through pipes 46 and 81 and an expansion valve 82 into a combination evaporator and condenser 11. This refrigerator unit 11 (see Figures 2 and 3) consists of evaporating tubes 17 connecting oppositely arranged header tanks 21 and 22.

From the header tank 22, the refrigerant vapor is drawn off by the compressor 14 through pipes 77 and 44, and in said pipe line a plurality of shut-off valves 56, 78, 79 and 80 are provided. In this manner the circuit of the refrigerant is closed.

The condenser 12 of this first refrigerating system is cooled by means of fresh water which is forced by a pump 36 into the space 30 in the condenser 12 through the pipe 108. From the space 30, the fresh water is drained off through a pipe 109. Suitable valves 119 and 120 are interposed respectively in the pipes 108 and 109. This condenser 12 may be of any suitable construction.

Figure 4:
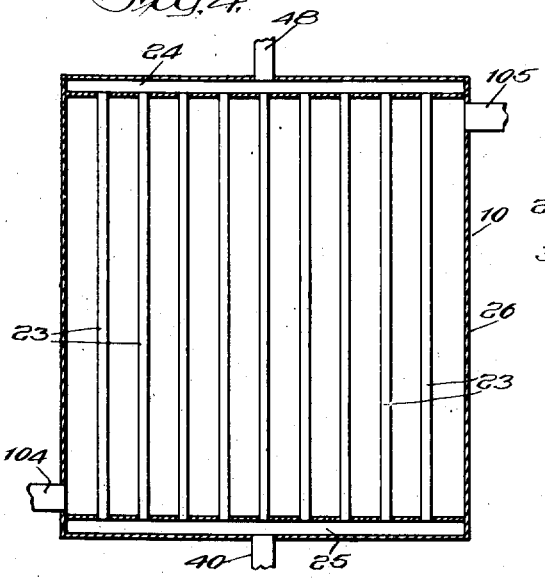
Figure 4 is a horizontal sectional view through an evaporator, shown in plan in Figure 1.

An exaporator 10 (see Figure 4) is provided, having two oppositely located header tanks 24 and 25 which are connected with each other by means of a plurality of refrigerating tubes 23, extending through the space 26 in the refrigerator 10. This evaporator may be of any other suitable construction.

Figure 1:
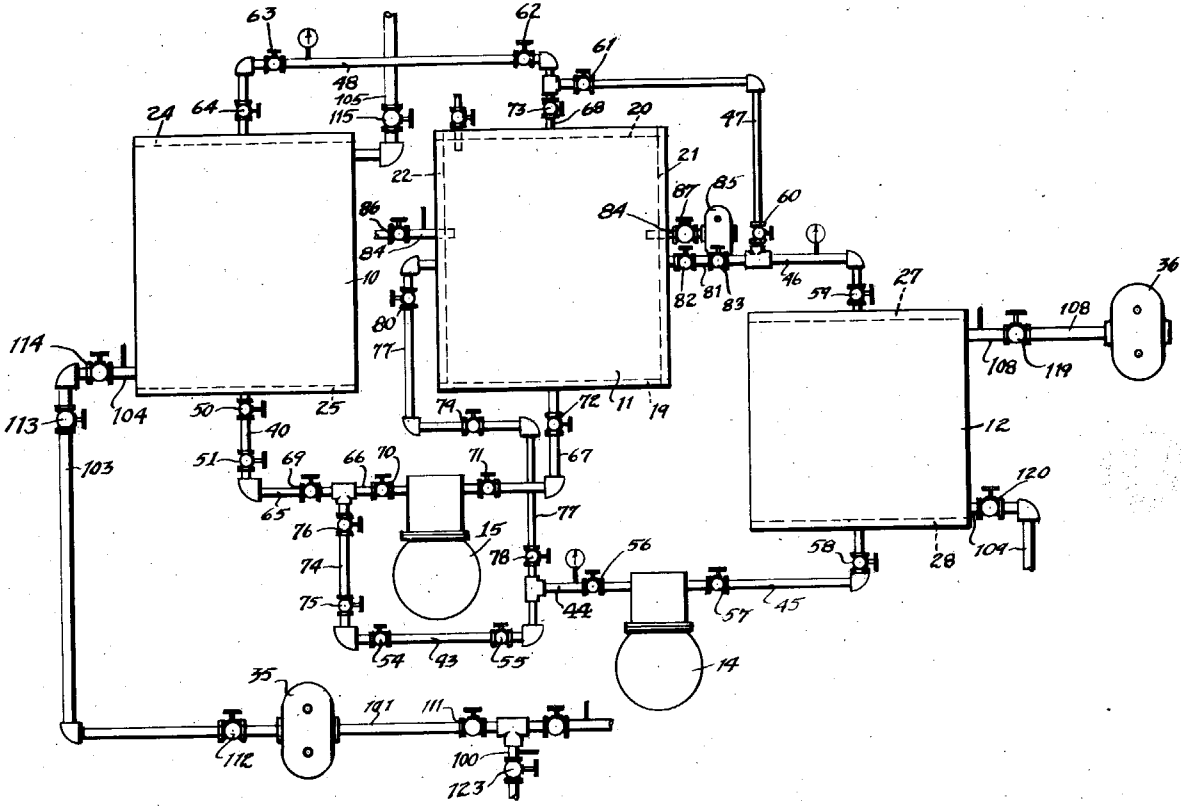
Figure 1 is a plan view of a plant embodying the principles of the invention.
Figure 2:
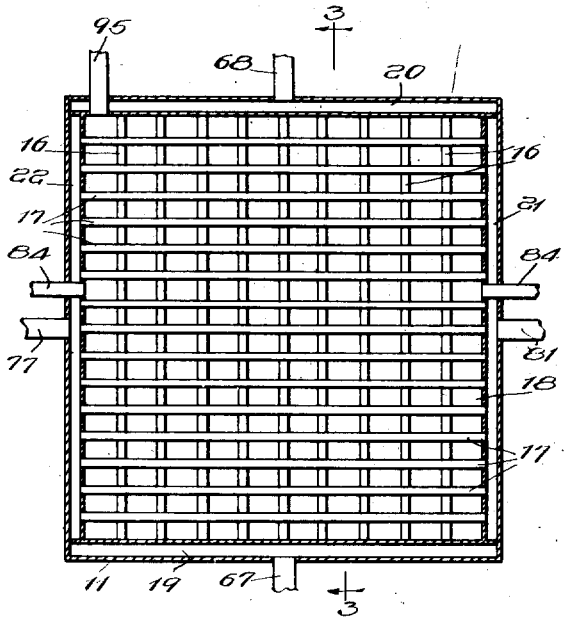
Figure 2 is a horizontal sectional view of a combination evaporator and condenser shown in plan in Figure 1.
Figure 3:
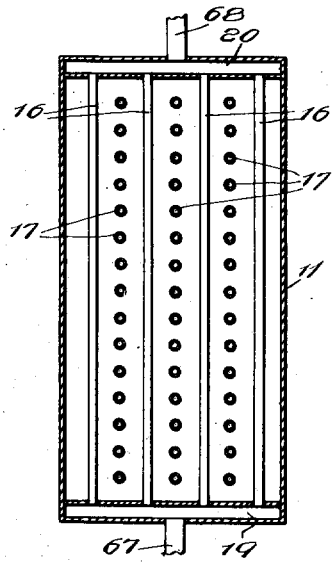
Figure 3 is a sectional view along the line 3—3 of Figure 2.

In the combination refrigerator and condenser unit 11, a plurality of condenser tubes 16 are arranged and extend at right angles between the evaporator tubes 17 as shown clearly in the Figures 2 and 3, the condenser tubes connecting two header tanks 19 and 20. Free passages are arranged in said unit for introducing and withdrawing a fluid medium, said medium being in contact with said condenser and evaporating tubes, if desired, coils or coils and tubes may be arranged in said unit, and the construction of said unit may be in the form of a shell or housing.

The refrigerant used in the second evaporator system is $CO_2$, and this refrigerant leaves the condenser tubes 16 and the header tank 20 in the liquid condition through pipes 68 and 48, and flows through an expansion valve 64 into the evaporator tubes 23. From here the refrigerant vapor is drawn off through pipes 40, 65 and 66 by a compressor 15, which recompresses and forces the refrigerant through a pipe line 67 into the header tank 19 and back into the $CO_2$ condenser tubes 16.

The above shows clearly that in the plant according to the present invention, two refrigerating stages are present, and that the $CO_2$ in the condenser tubes 16 is cooled by means of the evaporator tubes 17, that is, the refrigerant of the first refrigerating stage. It will be noted that the unit 11 has a larger cooling surface than condensing surface, thus especially adapting the unit for low temperature operation, whereby heat transfer is accomplished without excessive condensing surface. Within the broad concept of the invention, any suitable refrigerant or refrigerants may be used in the two stages. If carbon dioxide is used as the refrigerant in both stages, the pressure in the first stage will be normally high, but the pressure in the second stage will be exceptionally low. Carbon dioxide is safe in use, and hence desirable as a refrigerant on shipboard. If ammonia is used as the refrigerant in the two stages, the pressure in the second stage will be exceptionally low. The use of ammonia in the first and carbon dioxide in the second stage has the advantage that less power will be required with greater efficiency in the present split stage system, using ammonia in the first stage and carbon dioxide in the second stage, than in a single stage high pressure carbon dioxide system, in which the condenser is cooled by fresh water.

It will be understood that the pressure in the second stage $CO_2$ condenser is subject to control by varying either the temperature or the amount of refrigerant therein. Thus, it is possible to operate the second stage condenser at a pressure higher or lower than from 300 to 350 pounds at a given temperature, for example 0° F., by respectively increasing or decreasing the amount of carbon dioxide employed.

Also, the operating pressure of the second stage condenser may be reduced below or increased above the aforementioned pressure range by respectively decreasing or increasing the temperature in the condenser. Obviously, the operating pressure may also be changed by varying both the temperature and the amount of carbon dioxide employed, that is to say, that a pressure approximately from 100 to 500 pounds may be maintained in the $CO_2$ condenser at a given temperature.

Before starting the second refrigerating system in which $CO_2$ is used as a refrigerant, the $CO_2$ in the condenser tubes 16 in the combination tank will be cooled down to about zero Fahrenheit by the refrigerant in the evaporating tubes 17 of the first refrigerating system. It will be understood that both systems may be started at the same time if desired. If desired, a brine solution may be present in the space surrounding the evaporator tubes 17 and the condenser tubes 16 in the tank 11 and may be circulated in said space by means of a brine pump 85 and a pipe line 84. Suitable valves 86 and 87 are arranged in the pipe lines 84 at opposite sides of the unit 11.

If the pressure in the $CO_2$ condenser originally is 900 pounds at a temperature of about 75 degrees above zero Fahrenheit, this pressure will be reduced to about 300 to 350 pounds when the above mentioned temperature of zero Fahrenheit is obtained. That means that the pressure will be reduced about 66 percent when the second refrigerating system is started, and the liquid $CO_2$ will leave the condenser pipes 16 at approximately this temperature, and will enter the evaporator 10 at about the same temperature.

In this evaporator, the liquid $CO_2$ is vaporized and is then drawn off and recompressed by the compressor 15. Since this $CO_2$ enters the evaporator at a very low temperature, and evaporates at a still lower temperature, the suction pressure will be correspondingly low, so that the object of the invention is obtained, namely: Low temperature is produced by low condenser and suction pressure.

On account of the heat created by compression of the $CO_2$ and the heat absorbed by the housing or unit 11, and the necessity of maintaining a temperature below the liquefaction temperature of the $CO_2$ and to permit heat transfer without excessive condenser surface in the $CO_2$ condenser, the first refrigerating system has to have a capacity about 25 percent higher than the second one, and in addition to the 25 percent higher capacity mentioned, provision must be made for any additional load which may be carried by the first system, and for that reason the first stage refrigerating system must be provided with refrigerating tubes or coils having a greater heat absorbing capacity than the refrigerating tubes or coils of the second system (if tubes or coils are employed) and the refrigerating tubes 17 in the $CO_2$ condenser are placed closer together and are more in number than the condenser tubes or coils 16.

By a pump 35, any suitable heat carrying medium may be forced through pipes 103, 104, the $CO_2$ evaporator space 26 and a pipe 105 to a cooling room (not shown). From the cooling room, this medium may be returned through pipes 100 and 101 to the pump 35. The flow of the heat carrying medium is controlled by valves 111 to 115 and 123.

Extremely low temperatures may be produced by reducing the pressure on the low side of the $CO_2$ system down to approximately atmospheric pressure or to a vacuum by employing the absorption method.

If desired, the tank 11 may be eliminated and the fresh water cooled condenser 12 may be connected directly with the $CO_2$ evaporator by means of the pipes 46, 47, 48, and expansion valve 64.

The refrigerant gas in the evaporator 23 will then be drawn off and recompressed by the compressor 14 through the pipes 40, 65, 74, 43 and 44, and will be returned to the fresh water cooled condenser through the pipe 45. In this case the liquid refrigerant would enter the evaporator 10 at a higher temperature than described before, and in consequence, the suction pressure would be correspondingly higher. Thus, the plant may be converted at will into a single stage system.

The plant may also be operated as a single stage system with the unit 11 as a condenser. In this event, brine may be utilized as the cooling medium. The fresh water cooled condenser 12 with the compressor 14 can be disconnected by closing valves 55, 56, 60 and 83.

If the fresh water cooled condenser 12 is to be used in connection with the refrigerating tubes 17 in the tank 11, the valves 57 and 58 in the pipe line 45, valves 59 and 83 in the pipes 46 and 81, the valves 80, 79 and 78 in the pipe line 77 and the valve 56 in the pipe line 44 must be open. At the same time, valves 60 and 61 in the pipe 47 and a valve 55 in the pipe 43 must be closed. To connect the $CO_2$ evaporator 10 with the condenser tubes 16 in tank 11, valves 50, 51, 69, 70, 71, 72, 73, 62 and 63 in the pipes 40, 65, 66, 67, 68 and 48 must be open. When, however, the fresh water cooled condenser 12 is to be connected directly with the $CO_2$ evaporator, the valves 83, 73, 80 and 78 must be closed while the valves 59, 60, 61, 62, 63, 50, 51, 69, 76, 75, 54, 55 and 56 have to be open.

It will be evident that I have provided a refrigerating system which may be adjusted for use in different ways and which therefore is adapted to satisfy widely varying demands. Thus, the entire plant, including both stages, may be employed. In this event, brine may or may not be used in the refrigerator and condenser unit 11. If brine is used in the unit 11, it will be available at the temperature prevailing in the unit for use in the cooling room (not shown). Assuming that brine is circulated through the refrigerator 10, brine at two different temperatures will be available from separate sources, namely, from the units 10 and 11, respectively.

If the refrigeration requirements drop to such a point that the full capacity of the entire plant or system is not needed, the plant may be converted into any one of a plurality of single stage systems of varying capacity. For example, one single stage system may include the evaporator 10, the compressor 15, the condenser tubes 16 in the unit 11 and the expansion valve 64, connected in series in the order named, and utilizing either brine or fresh water as the condensing medium in the space 18 about the tubes 16. It will be understood that when brine is used as the condensing medium, it will be obtained from an outside source at a suitably low temperature.

As an alternative expedient, another single stage system comprises the refrigerator 10, the compressor 14, the fresh water cooled condenser 12 and the expansion valve 64, connected in series in the order named.

As a still further expedient, a third single stage system may include the tubes 17 in the unit 11 as refrigerating tubes in contact with brine or any other fluid medium to be cooled, the compressor 14, the fresh water cooled condenser 12 and the expansion valve 82, connected in series in the order named, preferably with ammonia as the refrigerant.

Thus, the refrigerating plant by reason of its convertibility at will into any one of a plurality of single and double stage systems, has a flexible capacity adapted to satisfy widely varying refrigeration demands. When the refrigeration demands are small, it would be wasteful to operate the entire plant at its maximum capacity, and hence one of the various single stage systems, best suited to the particular demand, would be employed.

Having described my invention and how the same is to be used, I claim as new, and desire to secure by Letters Patent:

1. In a two stage refrigerating system and method of producing low temperatures by low condenser and suction pressures two refrigerating systems adapted to cooperate with each other, the condenser of the first system being cooled by fresh water. a combination evaporator and condenser unit consisting of a closed housing containing the refrigerating tubes or coils of the first and the condenser tubes or coils of the second system with brine passages therebetween, a by-path connecting the pipe line, leading from the fresh water cooled condenser, to the pipe conducting the liquid of low boiling point from the condenser tubes of the second system to the evaporator of the same system, a second by-path connecting the suction line of the first system with the suction line of the second system, a valve adapted to prevent the entrance of the refrigerant into the evaporator tubes of the first system, another valve arranged in the suction line of the first system before the junction of said line with the second by-path, a third valve inserted in the suction line of the second system right behind the junction of the second by-path with said line, a fourth valve in the pipe conducting the liquid refrigerant of low boiling point to the evaporator of the second system and located between the outlet of the condenser of the second system and the first by-path and a valve in each of said by-paths.

2. A refrigerating system comprising, in combination, a primary system having an evaporator, a compressor, a suction conduit connecting said evaporator to said compressor, a fresh water cooled condenser connected to said compressor, an expansion valve connected to discharge into said evaporator, a discharge conduit connecting said condenser to said expansion valve, a secondary system having a second evaporator, a second compressor, a second suction conduit connecting said second evaporator to said second compressor, a second condenser connected to said second compressor, said second condenser and said first mentioned evaporator being arranged in heat exchange relation for the transfer of heat from the former to the latter, a second expansion valve discharging into said second evaporator, a second discharge conduit connecting said second condenser to said second expansion valve, a valve controlled connection between the second condenser and said second discharge conduit, a by-pass conduit including a control valve leading from said second suction conduit at a point between said second evaporator and said second mentioned compressor to said first mentioned suction conduit, and a by-pass conduit including a control valve leading from said first mentioned discharge conduit to said second discharge conduit.

3. A refrigerating system comprising, in combination, a primary system having an evaporator, a compressor, a suction conduit connecting said evaporator to said conpressor, a fresh water cooled condenser connected to said compressor, an expansion valve connected to discharge into said evaporator, and a discharge conduit connecting said condenser to said expansion valve, a secondary system having a second evaporator, a second compressor, a second suction conduit connecting said second evaporator to said second compressor, a second condenser connected to said second compressor, said second condenser and said first mentioned evaporator being arranged in heat exchange relation for the transfer of heat from the former to the latter, a second expansion valve discharging into said second evaporator, and a second discharge conduit connecting said second condenser to said second expansion valve, a by-pass conduit including a control valve for connecting said two suction conduits, and a by-pass conduit including a control valve for connecting said two discharge conduits.

4. A refrigerating system comprising, in combination, a primary system having an evaporator, a compressor, a suction conduit connecting said evaporator to said compressor, a fresh water cooled condenser connected to said compressor, an expansion valve connected to discharge into said evaporator, and a discharge conduit connecting said condenser to said expansion valve, a secondary system having a second evaporator, a second compressor, a second suction conduit connecting said second evaporator to said second compressor, a second condenser connected to said second compressor, said second condenser and said first mentioned evaporator being arranged for the transfer of heat from the former to the latter, a second expansion valve discharging into said second evaporator, and a second discharge conduit connecting said second condenser to said second expansion valve, a by-pass conduit including a control valve for connecting said two suction conduits, a control valve in said second suction conduit between said by-pass conduit and said second compressor, a by-pass discharge conduit including a control valve for connecting said discharge conduits, and a control valve in said second discharge conduit between said second condenser and said by-pass discharge conduit.

5. A refrigerating system comprising, in combination, an evaporator, an expansion valve discharging to said evaporator, and two separate refrigerant paths connected between the outlet of said evaporator and the inlet of said valve, said paths being selectively available, one path including a compressor and a brine and gas cooled condenser, the other path including a compressor and a water cooled condenser, and two separate paths arranged in said brine and gas cooled condenser, means for leading brine to and away from one of said separate paths, and means for leading a refrigerant to and away from the other of said separate paths.

6. A refrigerating system comprising, in combination, a primary single stage system including a first evaporator, a compressor, a condenser, and an expansion valve connected in series in the order named, a second single stage system including a second evaporator, a compressor, a second condenser and an expansion valve connected in series in the order named, said first evaporator and said second condenser being arranged in a single unit in heat exchange relation, means for circulating a fluid medium through said unit to effect a heat exchange therebetween and to cool the fluid medium to a low temperature for outside use, and means for circulating a fluid medium through said second evaporator to cool it to a low temperature, said systems being operable jointly, or one or the other may be operated single, by leading a fluid medium to be cooled through said unit in connection with said first or primary system, or by leading a fluid medium through said unit to cool the condenser of the second system.

7. A refrigerating system comprising, in combination, a compressor, a condenser, the inlet of said condenser being connected to the discharge of said compressor, a refrigerating element connected to the discharge of said condenser, an expansion valve interposed between said condenser and said element, the discharge of said element being connected to the inlet of said compressor, a second compressor, a second condenser having a housing for enclosing said refrigerating element, said second condenser being connected to the discharge of said second compressor, a refrigerator or evaporator connected to the discharge ends of said condensers, a valve controlled by-pass between the outlet of the first mentioned condenser and the outlet of the second mentioned condenser whereby the refrigerant from said condensers may be commingled and expanded into said refrigerator or evaporator, an expansion valve at the inlet of said refrigerator or evaporator, and valve controlled means connecting the discharge of said refrigerator or evaporator to said compressors.

8. A low temperature condenser and cooler comprising, in combination, a housing defining a chamber, condenser and cooler means defining a closed passage or passages extending through said chamber, means adapted to lead a medium to be condensed and cooled or a liquid to be cooled through said passage or passages, a refrigerating element or elements defining a closed passage or passages extending through said chamber and adapted to expand and evaporate a refrigerant therein to abstract heat from said first mentioned passage or passages, and means for leading cold brine through said chamber, said brine and said vaporized refrigerant being employed singly or jointly to abstract heat from said medium passing through said condenser and cooler means.

9. A refrigerating system comprising, in combination, a first system and a second system, each including a compressor, a condenser, an expansion valve and an evaporator connected in a closed circuit in the order named, a heat exchange in which the evaporator of the first system and said condenser of the second system are located and defining therewith a combination evaporator and condenser unit, means for leading a fluid medium to be cooled through said unit, said first system having a much greater heat absorbing capacity than said second system so as to remove the heat of the second system and also to remove heat from the medium passing through said unit.

10. In a refrigerating apparatus, a combined evaporator and condenser comprising a single closed housing defining a chamber, two opposed headers respectively at two opposite walls of said housing and having means for introducing and withdrawing a refrigerant, a plurality of rows of spaced condenser tubes connecting said headers and extending through said chamber, two opposed headers respectively at two other opposite walls of said housing and having means for expanding a refrigerant into one of said last mentioned headers, and a plurality of rows of spaced refrigerating tubes connecting said last mentioned headers and extending through said chamber, and means for introducing and withdrawing brine from said chamber.

11. A two stage refrigerating system consisting of two refrigerating systems, each system comprising a compressor, a condenser, an expansion valve and an evaporator arranged in the order named to form two closed refrigerating cycles, the first system employing a refrigerant of high boiling point and the second plant employing a refrigerant of low boiling point, the evaporator of one system and the condenser of the other system being arranged in a single closed shell or housing to constitute a combined evaporator and condenser unit having a free passage or passages for a fluid medium therethrough, valve controlled connections whereby one of said systems may be disconnected from the other system and said combined evaporator and condenser unit then made to function merely as an evaporator unit, and means whereby a fluid medium to be cooled is circulated through the free passage or passages in said unit.

12. In a two stage refrigerating system, a combined evaporator and condenser unit consisting of a closed housing provided with two sets of elements arranged in heat exchange relation and having free passages therebetween, the element of one set being a refrigerating element of one stage and the element of the other set being a condenser element of the other stage, the refrigerating element of one stage having a greater heat absorbing capacity than the condenser element of the second stage and also having a greater heat absorbing capacity than the evaporating element of the second stage, and means for circulating a fluid medium through said passages in contact with both sets of elements and for conveying the fluid medium to and away from said housing.

13. The process of producing low temperature without vacuum operation which consists in compressing, condensing, expanding and vaporizing a volatile refrigerant in one path in a continuous cycle, circulating a refrigerant of low boiling point in a second path in a continuous cycle, and with the vaporizing portion of the first path in heat exchange relation with the condensing portion of the second path, utilizing the low temperature of the vaporized refrigerant in the first path to greatly reduce the pressure and temperature of the refrigerant on the high side of the second path, maintaining the low pressure and low temperature on the high side of the second path during operation, thereby greatly reducing the power required in said second path, expanding and vaporizing the low temperature refrigerant of relatively low pressure by a correspondingly low suction pressure, circulating a fluid medium to be cooled in heat exchange with the low side of the second path, circulating a fluid medium in contact with the heat exchange portions of the two paths, and utilizing the fluid mediums from said portions and from the low side of the second path for outside use whereby fluid mediums of different temperatures are available.

14. The process of producing low temperature without vacuum operation which consists in compressing, condensing, expanding and vaporizing a volatile refrigerant in one path in a continuous cycle, circulating a refrigerant of low boiling point in a second path in a continuous cycle and with the vaporizing portion of the first path in heat exchange relation with the condensing portion of the second path, utilizing the low temperature of the vaporized refrigerant in the first path to greatly reduce the pressure and temperature of the refrigerant on the high side of the second path, maintaining the low pressure and low temperature on the high side of the second path during operation thereby greatly reducing the power required in said second path, expanding and vaporizing the low temperature refrigerant of relatively low pressure by a correspondingly low suction pressure and circulating a fluid medium in contact with the heat exchange portions of the two paths, and utilizing the medium for outside use.

15. In a combination condensing and refrigerating apparatus, a closed housing defining a chamber provided with a passage adapted to receive a refrigerant gas to be condensed and cooled to a low temperature, and a refrigerant cooling medium receiving passage for vaporizing a refrigerant therein, and a third passage adopted for introducing and withdrawing a fluid medium to be heated or cooled in direct contact with said other two passages, the last mentioned passage having a much greater heat absorbing surface than the condenser passage heat transfer surface, either two of said three mentioned passages may be operated independently.

16. A refrigerating system comprising, in combination, an evaporator, an expansion valve discharging into said evaporator, and two separate refrigerant paths connected between the outlet of said evaporator and the inlet of said valve, said paths being selectively available either singly or jointly, one path including a compressor and a water cooled condenser, the other path including a compressor and a low temperature brine or gas cooled condenser.

17. In a two-stage split stage system, having a compressor and a condenser, a conduit connecting said compressor and said condenser, a secondary condenser, a liquid discharge conduit connecting said condenser and said gas cooled condenser, an expansion valve inserted in said discharge conduit to supply refrigerant to said gas cooled condenser through said valve, an exhaust conduit opening from said gas cooled condenser, and connected to the inlet of said compressor to draw off the vaporized refrigerant and return the same to the first mentioned condenser, an evaporator, a liquid discharge conduit opening from said gas cooled condenser and connected to said evaporator, an expansion valve inserted in said last mentioned discharge conduit to supply refrigerant to said evaporator through said valve, a conduit connecting the discharge of said evaporator and the gas cooled condenser, a compressor inserted in said last mentioned conduit to draw off the vaporized refrigerant and return the same to the gas cooled condenser, a valve controlled branch conduit opening from said first mentioned liquid discharge conduit, and a valve controlled branch exhaust conduit in said first mentioned exhaust conduit.

18. A refrigerating apparatus comprising, in combination, a housing defining a chamber therein, a plurality of closed passages arranged in said shell or housing and including said chamber, one of said closed passages being adapted to expand and vaporize a refrigerant therein, another of said passages being adapted for leading cold brine therethrough, still another of said passages being adapted for leading a gaseous medium to be condensed or a liquid to be cooled therethrough, said vaporized refrigerant and said cold brine may be employed singly or jointly to abstract heat from said gaseous medium or from said liquid.

19. A split stage refrigerating system for producing low and moderate refrigeration temperatures, consisting of two independent refrigerating systems cooperating with each other, said systems permitting the use of different refrigerants, the condenser element of one system and the refrigerating element of the other system being arranged in heat exchange relation in a heat exchange unit having a free fluid passage therethrough, and means for leading a fluid medium to be heated or cooled in heat exchange relation with said elements to and away from said unit, either one of said systems when desired may be operated as an independent refrigerating system to do useful refrigerating work.

20. In a refrigerating apparatus of the character described, a closed housing provided with a plurality of independent passages for condensing a refrigerant and for vaporizing a refrigerant and to receive a fluid to be heated or cooled, each of said passages having separate inlets and outlets whereby different refrigerants and a medium to be heated or cooled may be conveyed through said independent passages and in heat exchange relation with each other, the vaporizing passage being of greater capacity than the condenser passage.

AUGUST SCHWARZ.